United States Patent
Zhang et al.

(10) Patent No.: US 8,200,679 B2
(45) Date of Patent: Jun. 12, 2012

(54) ESTIMATING CARDINALITIES OF XML TABLE CONSTRUCTS WITHIN QUERIES

(75) Inventors: Ning Zhang, Palo Alto, CA (US); Sam Idicula, Santa Clara, CA (US); Sivasankaran Chandrasekar, Menlo Park, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 368 days.

(21) Appl. No.: 12/328,642

(22) Filed: Dec. 4, 2008

(65) Prior Publication Data

US 2010/0145957 A1    Jun. 10, 2010

(51) Int. Cl.
    *G06F 17/00*    (2006.01)
(52) U.S. Cl. .................. 707/755; 707/719; 711/170
(58) Field of Classification Search .................. 711/170
    See application file for complete search history.

(56) References Cited

U.S. PATENT DOCUMENTS

2007/0271218 A1*  11/2007  Lim et al. ..................... 707/2
2008/0288444 A1*  11/2008  Edwards et al. ............... 707/2

* cited by examiner

*Primary Examiner* — Belix M Ortiz Ditren
(74) *Attorney, Agent, or Firm* — Hickman Palermo Truong Becker Bingham Wong LLP (57) ABSTRACT

Techniques are provided for estimating the cardinality of a virtual result table that is produced by executing path-based table functions within a query, such as the XMLTABLE function. Some path-based table functions apply a path expression to input from a base table of XML documents to select rows to produce the result table. Path statistics are collected for the path expressions for the base table. The path statistics are used to estimate the cardinalities of the result table. The estimated cardinality of the result table is useful for estimating costs of query execution plans that are generated for the query.

20 Claims, 4 Drawing Sheets

```xml
<movies>                                                    101
    <movie>
        <title>The Lord of the Rings: Fellowship of the Ring</title>
        <director>Peter Jackson</director>
        <year>2001</year>
        <cast>
            <actor>Elijah Wood</actor>
            <actor>Sean Astin</actor>
            <actor>Ian Holm</actor>
        </cast>
    </movie>
    <movie>
        <title>The Lord of the Rings: The Two Towers</title>
        <director>Peter Jackson</director>
        <year>2002</year>
        <cast>
            <actor>Elijah Wood</actor>
            <actor>Sean Astin</actor>
            <actor>Ian Holm</actor>
        </cast>
    </movie>
    . . . .
</movies>
```
(labeled 105)

```xml
<tvseries>                                                  103
    <drama>
        <title>Homicide: Life on the Street</title>
        <actor>Elijah Wood</actor>
        <actor>Richard Belzer</actor>
        . . . .
    </drama>
    <comedy>
        <title>King of the Hill</title>
        <actor>Mike Judge</actor>
        <actor>Elijah Wood</actor>
        . . . .
    </comedy>
    . . . .
</tvseries>
```

ESTIMATING CARDINALITIES OF XML TABLE CONSTRUCTS WITHIN QUERIES

FIELD OF THE INVENTION

The present invention relates to techniques for optimizing the execution of queries, and in particular, for optimizing the execution of queries on data that are encoded with the eXtensible Markup Language (XML), and stored in a database.

BACKGROUND

Database queries request particular information to be retrieved from a database. The information that is retrieved comprises the results of answering the query. The Structured Query Language (SQL), SQL/XML (eXtensible Markup Language), and other proprietary forms of SQL that are based on the SQL standard are examples of database languages that are used to form a database query. Although examples and embodiments shown hereinafter primarily refer to using SQL and SQL/XML, it is understood the techniques described the present application are not limited to use with SQL and SQL/XML, and can be implemented with other compatible database languages.

A query does not specifically state how the results are to be retrieved from a database. A same set of results for a particular query can be retrieved from a database by using one of a multitude of semantically equivalent access plans, or query execution plans. A query optimizer is a component of the database management system (DBMS) that generates query execution plans for a query, and selects the optimal query execution plan with the estimated lowest performance cost. The cost of executing a sub-optimal plan can be orders-of-magnitude more than the cost of executing an optimal plan. Accordingly, it is crucial to query performance that the query optimizer is able to accurately estimate and choose the most-optimal plan for execution.

Queries that have join operations are examples of queries for which query performance can vary greatly depending on the query execution plan used. Such queries require information from two or more tables, and contain join predicates to combine the information from the two or more tables. For example, information from three tables are required to answer the following query:

```
SELECT A.Title, C.Title, B.Actor_name
FROM A, B, C
WHERE A.title = B.title and B.Actor_name = C.Actor_name
```

Query plans generated for this query may differ in the join order used to combine the three tables. For example, one query execution plan employs a join order that first joins A and B using the A.title=B.title predicate to produce an intermediate result, and then joins the intermediate result with C using the B.Actor_name=C.Actor_name predicate. Alternatively, another query execution plan employs a different join order that first joins B and C using the B.actor_name=C.actor_name predicate, and then joins the intermediate result with A using the A.title=B.title predicate.

The cost of either query execution plan can be estimated in part from the cardinality of the respective tables that are being joined. The cardinality of a table is the number of rows in the table. In the above example, the cardinality of the tables contributes to a difference in costs for a query execution plan because the cardinality affects the cardinality of the intermediate result from the first join, which in turn affects the total cost of joining together the three tables. For example, if A has a small cardinality, B has a medium cardinality, and C has a large cardinality, joining A and B before joining C may perform better than joining B and C before joining A because joining A and B will likely produce fewer intermediate results than joining B and c due to the smaller respective cardinalities of A and B. The selectivity of the join predicates also affect the execution cost of joining together the three tables.

Because the cardinalities of the tables included in a query affect the estimated cost of different query execution plans, a query optimizer considers the cardinality of tables in estimating costs for different query execution plans. However, not all tables' cardinalities are readily available to the query optimizer, including, for example, tables that are generated by executing path-based table functions within the query.

A path-based table function is a function within a query that selects XML data from a collection of XML documents based on a path expression, and produces a path-based table construct. The path-based table construct, which is a set of rows in a similar form as an object-relational table, can be used within a query wherever a table would be employed. For example, a path-based table construct can be joined with another a path-based table construct, or joined with an object-relational table. Such path-based table functions include XMLTABLE and XPATHTABLE.

In a previous approach, when a query includes an XMLTABLE row source, the query optimizer estimates the costs of query execution plans for the query by using a fixed value, for example, 1000, as the default cardinality for the row set produced by the XMLTABLE row source. Accordingly, if a query required performing multiple join operations on three row sets produced by XMLTABLE row sources, the query optimizer would use the same default cardinality for all three row sets when estimating the costs the different query execution plans, regardless of the true cardinality of the row sets. Thus, because the same default cardinality is used in estimating the costs of the different join orders, the cardinalities of row sets produced by the XMLTABLE row sources may be ineffective as factors for estimating costs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Techniques are provided for estimating the cardinality of a result set that is produced by a path-based table function by using statistics that are produced for input tables in the query. In particular, the input tables hold XML data, and the row source produces a row set from the XML data.

Overview of XML and Relational Databases

Figure 1A:
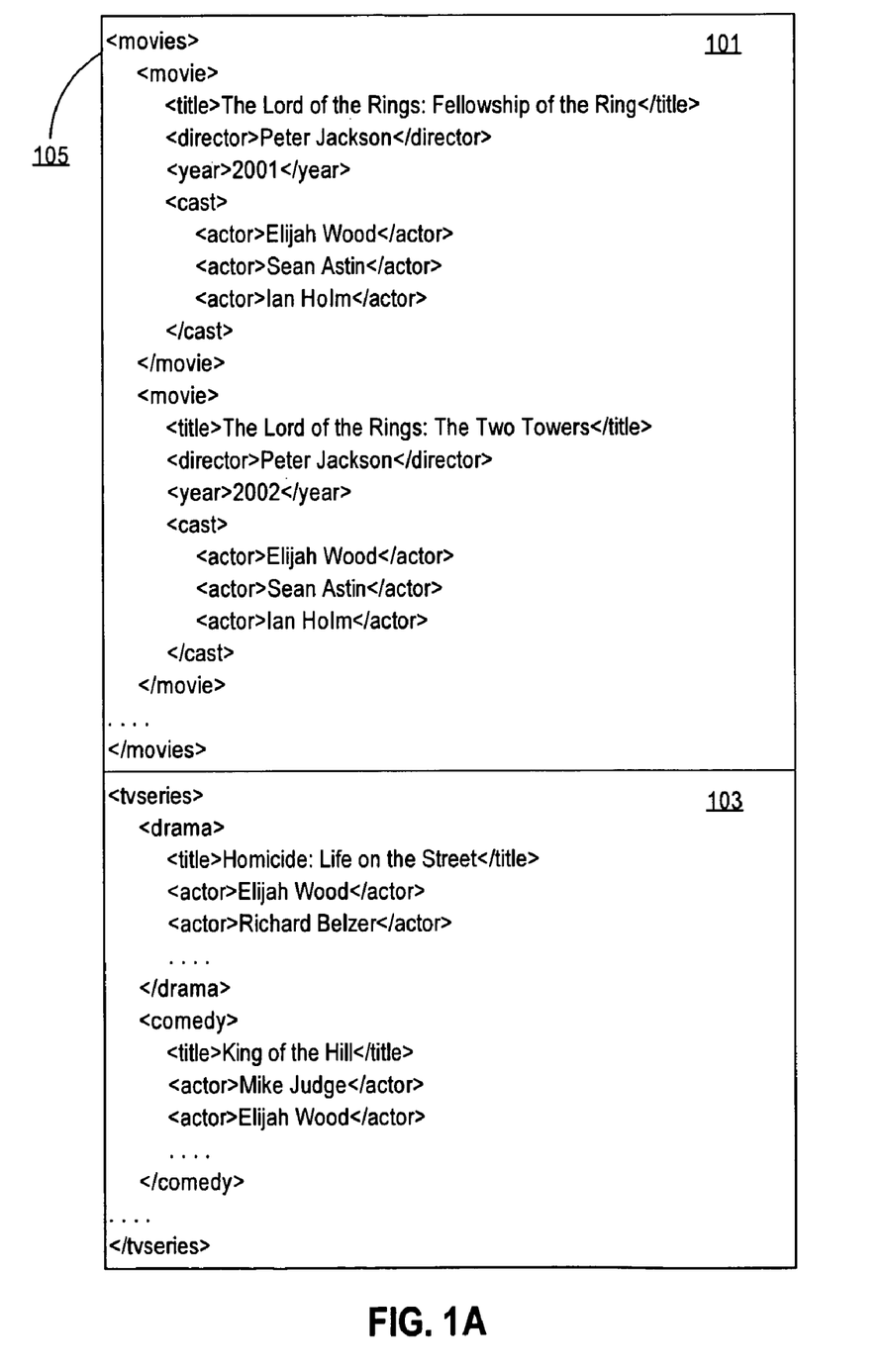
FIG. 1a is a diagram that shows an example of a collection XML documents that are stored in an object-relational table.

XML represents data as a document with a hierarchical structure. FIG. 1 illustrates the hierarchical structure of XML data in XML documents 101 and 103. XML document 101 begins with a start tag <movies>, and ends with an end tag </movies>. Start tags, like <movies> and <movie>, are elements of the XML document, and the data between a start tag and an end tag comprises the content of the element. Elements are also referred to as nodes. Elements that are nested at the same level as each other belong in the same hierarchical level. For example, the <movie> element belongs to the same hierarchical level as the other <movie> element. The elements <title>, <director>, <year> and <cast> belong in the same hierarchical level.

Figure 1B:
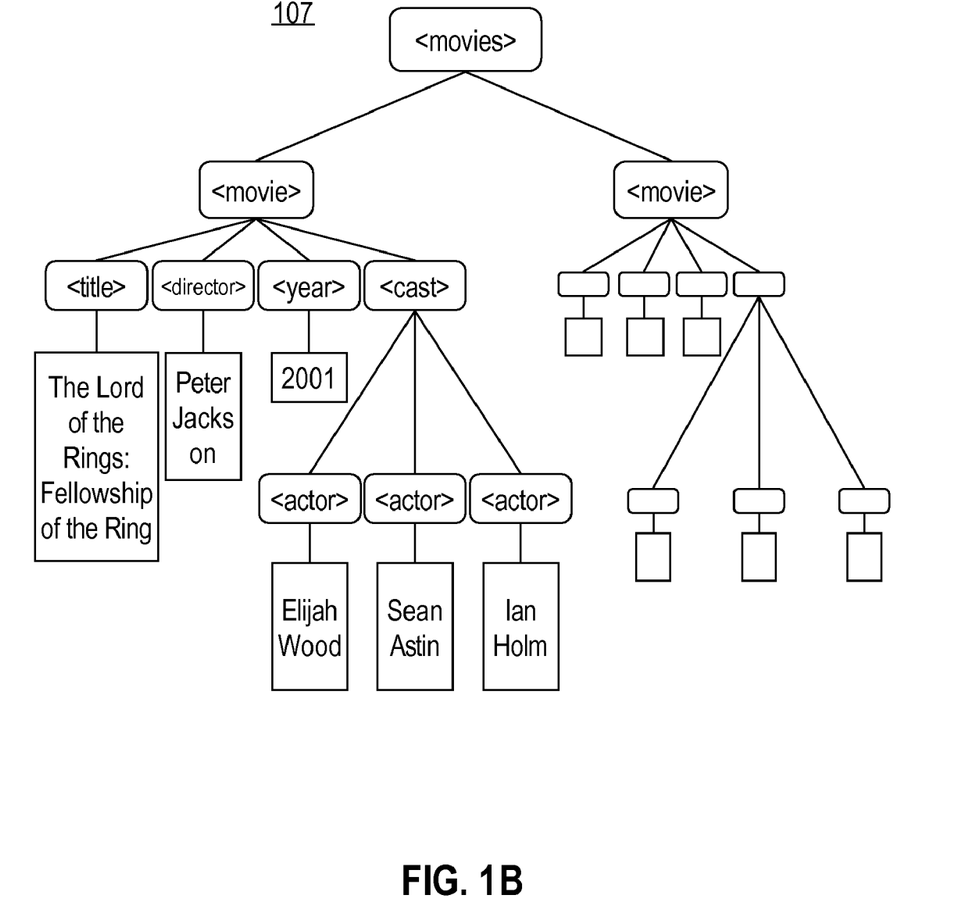
FIG. 1b is a diagram that shows a tree hierarchy for an XML document.

The XQuery 1.0/XPath 2.0 Data Model, which are standards for the storage and management of XML data, are described in "W3C Working Draft," 9 Jul. 2004, incorporated by reference as if fully set forth herein. According to one aspect of the data model, a XML document is represented by a hierarchy of nodes that reflects the hierarchical nature of the XML document. Tree 107, in FIG. 1*b*, is a diagram that represents the hierarchy of nodes from XML document 101. A hierarchy of nodes is composed of nodes at multiple levels. A node may have one or more of parent nodes, child nodes, and sibling nodes. In tree 107, a node links to a parent node that is above the node. Also, a node links to a child node that is below the node. A leaf node is a node that does not have any children nodes, and is at the bottom of the hierarchy. In contrast, a root node, which has no parent nodes, is at the top of hierarchy. For example, in tree 107, <movies> is the root node. Nodes at the same hierarchical level are sibling nodes. For example, <title>, <director>, <year>, and <cast>, which are nodes that have the same parent node, are sibling nodes.

XML elements can be queried or referenced using path expressions, including path names, which conform to the XPath (XML Path Language) or XQuery (XML Query Language) standards, or PathIDs, which is a compact representation of a path name. In the example below, PathIDs are hexadecimal numeric values. PathIDs are used instead of path names to reduce the amount of storage required to represent the path. The following is an example of a Path to PathID mapping:

| PathID | Path |
|---|---|
| 0x1 | /movies |
| 0x2 | /movies/movie |
| 0x3 | /movies/movie/title |
| 0x4 | /movies/movie/cast/actor |

Path expressions that are path names are described in Section 3 ("Expressions") of "XML Path Language (XPath)" (version 1.0). In one example of a path name, each part of the name identifies an element at each level of the XML document's hierarchy. Each part of the name identifies which nodes to keep, and which nodes to prune. Thus, the result of evaluating a path name is a sequence of nodes that satisfy the expression. For example, in evaluating the path name /movies/movie/title, the expression selects the node(s) named "title" that are under the nodes named "movie," that are under the nodes named "movies," which is the top node of the document.

According to one embodiment of the invention, XML documents are stored in a SQL database using the "XML type" as a native data type to natively store, manage, and query XML in a SQL database. XML documents are stored in relational tables in a column defined as an XML type column. One column can store multiple XML documents in multiple records. Base table 105 in FIG. 1*a* shows a table that is storing XML document 101, along with other XML documents, in a single column in the XML data type. Tables which store XML documents as a native data type are generally referred to as base tables.

XMLTABLE

One way of querying XML data that is stored in base table 105, also referred to as a master table, is by using a path-based table function, such as XMLTABLE. The path-based table function takes a base table, like base table 105, as an input data source, evaluates a path name, such as an XQuery expression, against the base table, and shreds the result of the path name evaluation into the relational rows and columns of a path-based table construct, which is a new virtual result table that is in a similar form as an object-relational table. XMLTABLE can be used in the FROM clause of a SQL statement. The resulting path-based table construct produced from a path-based table function can be used in a query where a table name would be used.

The following is an example of a query, expressed as a SQL statement, with a path-based table function that produces a path-based table construct. The SQL statement, when executed, selects the movie title, the TV series title, and the actor name, if the movie was directed by "Peter Jackson" in 2001, and some actor appears in both the cast for the movie and in the cast of a TV series.

Example SQL/XML Query

```
SELECT A.Title, C.Title, B.Actor_name
FROM imdb, XMLTABLE('/movies/movie' PASSING
imdb.object_value
    COLUMNS Title VARCHAR2(100) PATH '/movie/title',
        Year NUMBER PATH '/movie/year',
        Director VARCHAR2(60) PATH '/movie/director',
        Cast XMLTYPE PATH '/movie/cast') A,
    XMLTABLE('/cast/actor' PASSING A.Cast
        COLUMNS Actor_name VARCHAR2(60) PATH
        '/actor/name') B,
    XMLTABLE('/tvseries/drama' PASSING imdb.object_value
        COLUMNS Actor_name VARCHAR2(60) PATH '/drama/actor',
            Title VARCHAR2(100) PATH '/drama/title') C
WHERE A.Year = 2001 and A.director = "Peter Jackson" and
B.Actor_name = C.Actor_name;
```

In the above example, XMLTABLE takes as a first argument the XQuery expression '/movies/movie', which is also a driving path expression for each row of the row set produced by evaluating XMLTABLE. The driving path expression is evaluated against base table 105's column, imdb.object_value to select the nodes that satisfy the expression. The nodes are shredded into rows and columns of a virtual relational table. The columns for the resulting relational table are listed and defined in the COLUMNS clause. In the example, the TITLE column contains character values that satisfy the path '/movie/title', the YEAR column contains number values that satisfy the path '/movie/year', and the CAST column contains XML Type data type values that satisfy the path '/movie/cast'. The resulting virtual table is labeled A.

Path Statistics and Cardinality

The cardinality of a table is the number of rows in the table. The cardinality of a row set, such as the row set produced when evaluating an XMLTABLE function, is the number of rows in the row set. In the above example, each node that satisfies the driving path expression '/movies/movie' produces a row that is shredded into the columns defined in the COLUMNS clause. Accordingly, the cardinality of the row set A can be inferred from the number of nodes returned from evaluating the driving path expression '/movies/movie' against input data from base table 105.

According to one embodiment of the invention, a set of unique path expressions is determined for all nodes for a master base table that is stored in the database. The following is an example of path statistics collected for the base table:

| Example Statistics for a Master Base Table | | | |
|---|---|---|---|
| Path ID | Node_count | parent_count | descen_count |
| 0xD | 400 | 3 | 15 |
| 0xD1 | 500 | 4 | 18 |
| 0xDA | 5 | 5 | 30 |
| ... | | | |

As shown in the above example, the Path ID is a hexadecimal value that represents a possible path expression for a base table. Statistics that are collected include a node count of all the nodes that satisfy the particular path represented by the Path ID, a parent node count of all the nodes that are hierarchically above the nodes represented by the Path ID, and a descendant node count of all the nodes that are hierarchically below the nodes represented by the Path ID.

According to one embodiment of the invention, the statistics for a particular base table, or base table column, are generated and stored by the database system. When a query optimizer that is executing optimization routines for evaluating a query requires the cardinality of a table to estimate a cost of a particular query execution plan, the statistics are used by the query optimizer to determine the cardinality of the table.

In one embodiment, path statistics are collected by executing a command that causes the database system to collect node statistics for a particular table that stores XML data natively as XML Type data in a master base table. The statistics-gathering command can be executed at any time. According to one embodiment, the statistics-gathering command is executed when XML data is first stored in the master base table. The statistics-gathering command does not necessarily have to be executed when the data inside the master base table is changed because many changes do not affect the statistics of the XML data. The statistics-gathering command can be executed if it is suspected that the current set of path statistics is inaccurate, and is not providing the correct cardinality estimates for the tables in the query.

Using Statistics to Estimate Cardinality—Simple Case

Determining the cardinality of virtual table A is one of the simpler uses of path statistics because of the direct relationship between the cardinality of the table and the node count of the driving path expression.

Referring to the above Example SQL/XML Query, virtual table A is produced from an XMLTABLE function that takes input from the master table imdb, which is not filtered by any predicates in the query (i.e. in the WHERE clause). As discussed above, the rows in virtual table A are chosen by the driving path expression '/movies/movie'. The driving path expression '/movies/movie', also represents the nodes from imdb.object_value that satisfy the expression. Thus, the number of rows in virtual table A is equal to the number of nodes that satisfy the path expression. According to one embodiment, if path statistics are collected for '/movies/movie', then the cardinality of virtual table A can be determined by the query optimizer by using the node_count statistic for the Path ID that represents '/movies/movie'.

Using Statistics to Estimate Cardinality—Complex Case

Determining the cardinality of virtual result tables that are produced from an XMLTABLE function that takes input from another virtual result table requires a more complicated use of the statistics.

Figure 2:
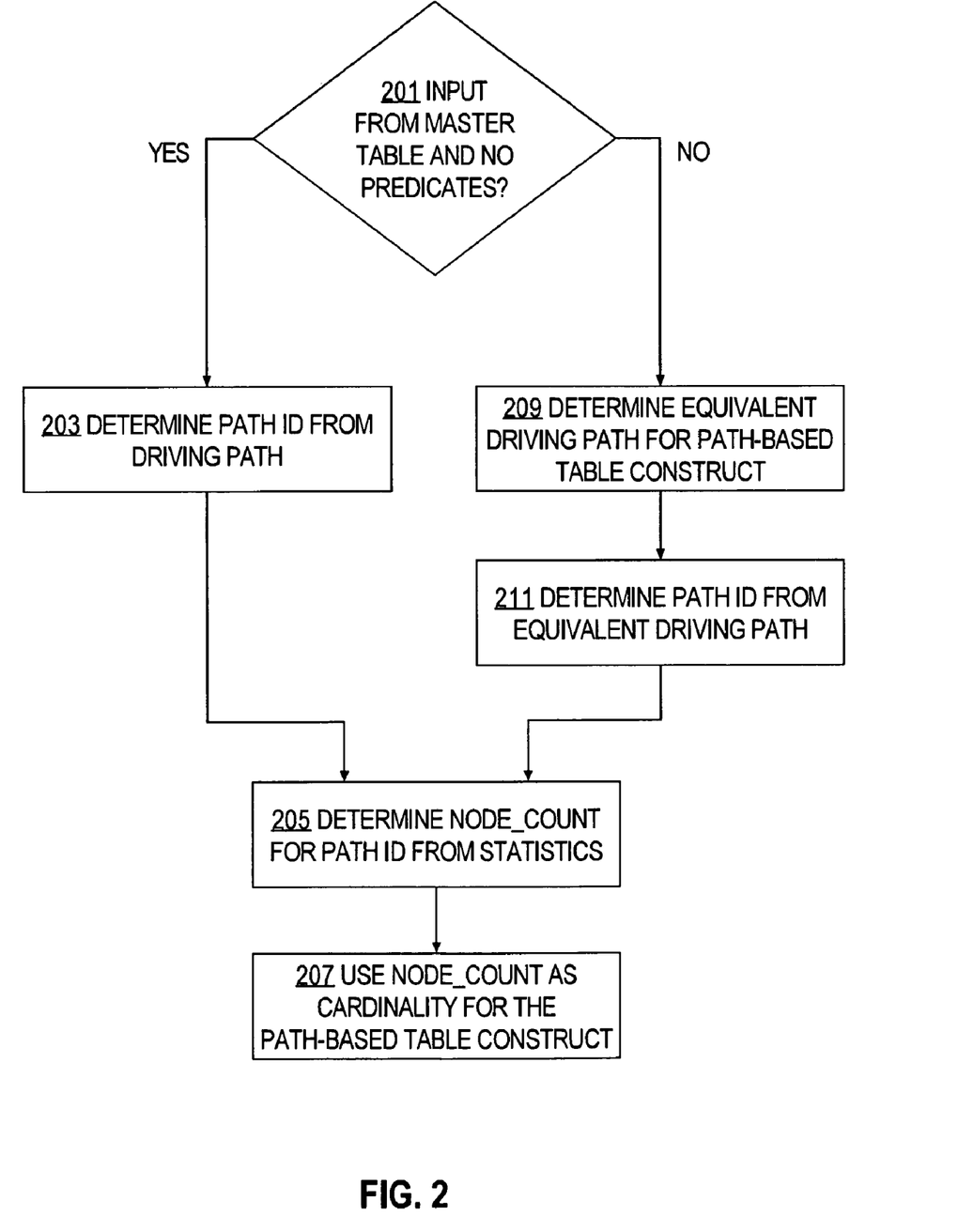
FIG. 2 is a flow diagram illustrating a complex case for estimating cardinality using path statistics that are determined for path expressions of a master base table natively storing XML data, according to one embodiment of the invention.

FIG. 2 is a flow diagram that illustrates the complex case of using statistics to estimate cardinality of a virtual table that is generated from evaluating a path-based table function, such as the XMLTABLE function, according to one embodiment of the invention. In step 201, the query optimizer determines whether a path-based table function takes input from a master table, or from a path-based table construct. The query optimizer also determines whether there are any predicate conditions for the input table or table construct. In step 203, if the input is from a master table, and there are no predicates for the input, then the query optimizer determines the Path ID that corresponds to the driving path used in the path-based table function. In step 205, the query optimizer looks up the node_count statistic for the Path ID, and in step 207, the query optimizer uses the node_count as the cardinality for the virtual table.

In step 209, if the input for the virtual table is from a virtual parent table, and not from a master table, then the query optimizer determines an alternate driving path expression that would produce the same result, when applied to the master table, as original driving path expression. In particular, all the parameters that are used to select the rows for the virtual table, including any parameters that are used for generating the virtual parent table, are concatenated together into an equivalent path expression that can be employed to look up the path statistics that are gathered for the master table.

For example, referring to the above Example SQL/XML Query, row set B is generated from an XMLTABLE function that takes input from virtual table column A.cast. A.cast stores data in the XML Type data type. Furthermore, the predicates A.year=2001 and A.director="Peter Jackson" in the WHERE clause are applied to A.cast before A.cast is used as input for the XMLTABLE function.

Because virtual table B takes input from virtual table A, the rows for virtual table B are selected based on virtual table B's driving path expression, '/cast/actor', as well as based on virtual table A's driving path expression, '/movies/movie', and virtual table A's predicates, A.year=2001 and A.director="Peter Jackson". Accordingly, a concatenation of the expressions and predicates forms a path expression '/movies/movie[year=2001][director="Peter Jackson"]/cast/actor', which is the equivalent driving path that selects the rows for virtual table B relative to the master table imdb.

In step 211, the query optimizer uses the equivalent driving path to identify the appropriate Path ID to use for finding the statistic in the path statistics collected for the master table. Specifically, the query optimizer finds the node_count statistic for the equivalent driving path in the path statistics, and uses the node_count number as the cardinality for the virtual table.

For example, the number of rows selected for virtual table B is equal to the number of nodes that satisfy the concatenated path expression. The query optimizer determines the cardinality of B from the node_count statistic maintained for the Path ID that corresponds to the path expression '/movies/movie[Year=2001][director="Peter Jackson"]/cast/actor'.

Hardware Overview

Figure 3:
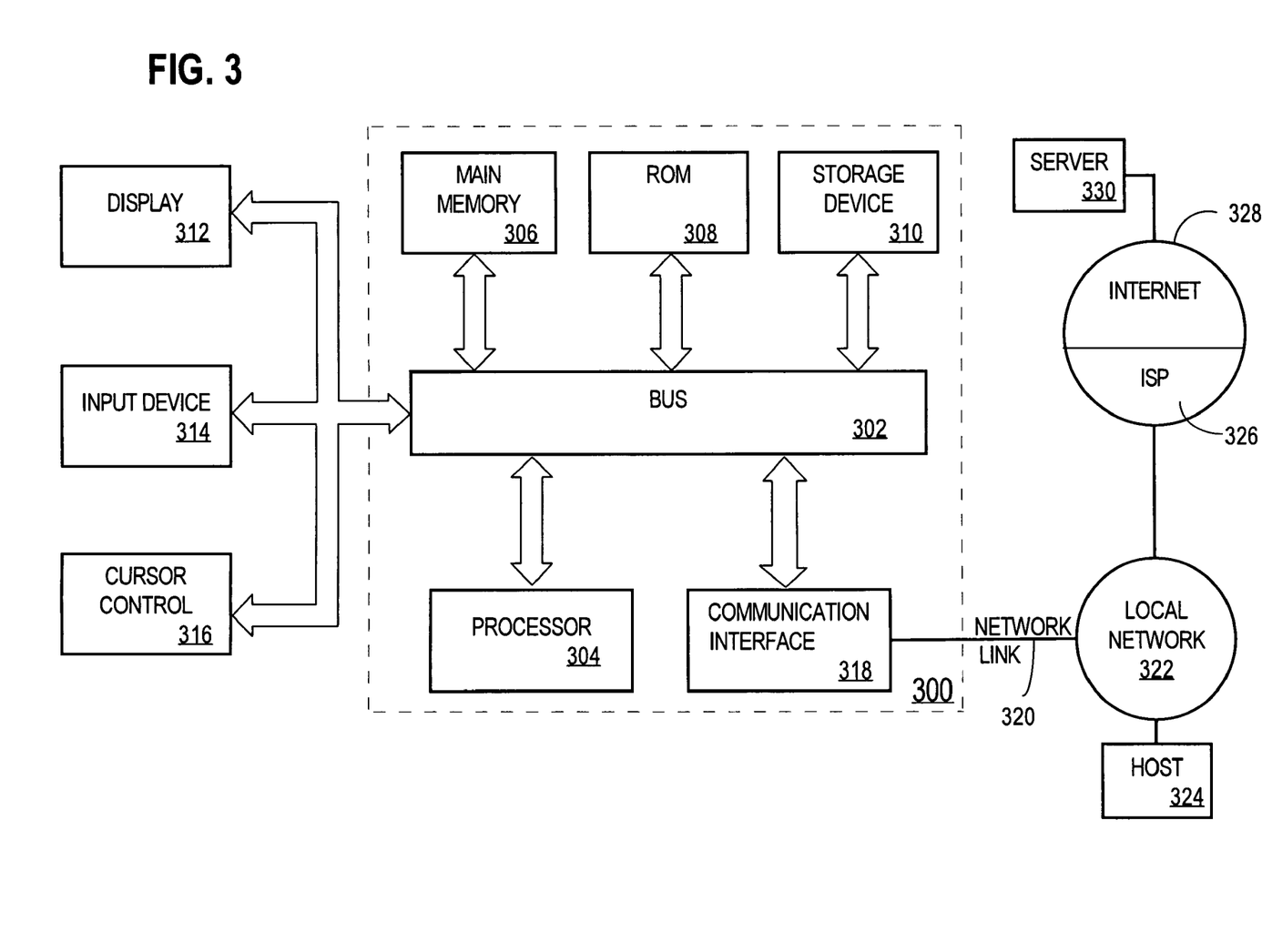
FIG. 3 is a block diagram is a diagram of a computer system on which one embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising the steps of:
   maintaining path statistics for a collection of XML documents;
   wherein, for each path expression of a set of path expressions, said path statistics indicate at least a node-count statistic, which comprises a number of nodes within said collection that is satisfied by said path expression; and
   estimating, based on said path statistics, a cardinality of a row set of a path-based table construct identified within a query, wherein the row set of said path-based table construct is produced by evaluating a path-based table function within the query, and wherein each row of the row set is produced based on evaluating a path expression against input data to said path-based table function;
   wherein the method is performed by one or more computing devices.

2. The method as recited in claim 1, wherein said path-based table construct comprises a set of rows.

3. The method as recited in claim 1, wherein said path-based table function is a SQL/XML function.

4. The method as recited in claim 1, wherein input data for said path-based table function includes a table that stores said collection of XML documents.

5. The method as recited in claim 1, wherein input data for said path-based table function includes data from another path-based table construct.

6. The method as recited in claim 1, wherein the step of estimating said cardinality of said path-based table construct comprises the steps of:
   determining a path expression that, when applied to said collection of XML documents, produces said path-based table construct;
   identifying the node-count statistic for said path expression from said path statistics; and
   estimating said cardinality to be said node-count statistic.

7. The method as recited in claim 6, wherein the step of determining a path expression includes:
   determining that input data for the path-based table function includes the collection of XML documents; and
   employing a driving path expression, which is a parameter for said path-based table function, as said path expression.

8. The method as recited in claim 6, wherein the step of determining a path expression includes:
   determining that input data for said path-based table function includes data from a second path-based table construct;
   identifying one or more elements based on which said second path-based table construct was produced, wherein said one or more elements includes:
      one or more driving path expressions for a second path-based table function that produced said second path-based table construct, or
      one or more predicates that limit said second path-based table construct; and
   determining a second path expression that is based on at least said one or more elements; and
   employing said second path expression as said path expression.

9. The method as recited in claim 1, wherein said path statistics are generated in response to receiving a request to generate said statistics.

10. The method as recited in claim 1, wherein the estimated cardinality is used by a query optimizer to estimate costs for one or more query execution plans.

11. A non-transitory machine-readable medium storing one or more sequences of instructions which, when executed by one or more processors, causes the one or more processors to perform steps of:
    maintaining path statistics for a collection of XML documents;
    wherein, for each path expression of a set of path expressions, said path statistics indicate at least a node-count statistic, which comprises a number of nodes within said collection that is satisfied by said path expression; and
    estimating, based on the path statistics, a cardinality of a row set of a path-based table construct identified within a query, wherein the row set of the path-based table construct is produced by evaluating a path-based table function within the query, and wherein each row of the row set is produced based on evaluating a path expression against input data to the path-based table function.

12. The non-transitory machine-readable medium of claim 11, wherein said path-based table construct comprises a set of rows.

13. The non-transitory machine-readable medium of claim 11, wherein said path-based table function is a SQL/XML function.

14. The non-transitory machine-readable medium of claim 11, wherein input data for said path-based table function includes a table that stores said collection of XML documents.

15. The non-transitory machine-readable medium of claim 11, wherein input data for said path-based table function includes data from another path-based table construct.

16. The non-transitory machine-readable medium of claim 11, wherein the step of estimating said cardinality of said path-based table construct comprises the steps of:
    determining a path expression that, when applied to said collection of XML documents, produces said path-based table construct;

identifying the node-count statistic for said path expression from said path statistics; and estimating said cardinality to be said node-count statistic.

17. The non-transitory machine-readable medium of claim 16, wherein the step of determining a path expression includes:

determining that input data for the path-based table function includes the collection of XML documents; and employing a driving path expression, which is a parameter for said path-based table function, as said path expression.

18. The non-transitory machine-readable medium of claim 16, wherein the step of determining a path expression includes:

determining that input data for said path-based table function includes data from a second path-based table construct;

identifying one or more elements based on which said second path-based table construct was produced, wherein said one or more elements includes:

one or more driving path expressions for a second path-based table function that produced said second path-based table construct, or one or more predicates that limit said second path-based table construct; and determining a second path expression that is based on at least said one or more elements; and employing said second path expression as said path expression.

19. The non-transitory machine-readable medium of claim 11, wherein said path statistics are generated in response to receiving a request to generate said statistics.

20. The non-transitory machine-readable medium of claim 11, wherein the estimated cardinality is used by a query optimizer to estimate costs for one or more query execution plans.

* * * * *

UNITED STATES PATENT AND TRADEMARK OFFICE
CERTIFICATE OF CORRECTION

PATENT NO. : 8,200,679 B2
APPLICATION NO. : 12/328642
DATED : June 12, 2012
INVENTOR(S) : Ning Zhang et al.

It is certified that error appears in the above-identified patent and that said Letters Patent is hereby corrected as shown below:

In the Specification

In column 2, line 7, before "due" delete "c" and insert -- C --, therefor.

In column 7, line 1, delete "peter jackson"" and insert -- "Peter Jackson". --, therefor.

In column 7, line 3, delete "peter jackson"" and insert -- "Peter Jackson". --, therefor.

In column 7, line 19, delete "peter jackson"" and insert -- "Peter Jackson". --, therefor.

In column 9, line 51, delete "3."" and insert -- "2." --, therefor.

In column 9, line 53, delete "4."" and insert -- "3." --, therefor.

In column 9, line 56, delete "5."" and insert -- "4." --, therefor.

In column 9, line 59, delete "6."" and insert -- "5." --, therefor.

In column 10, line 1, delete "7."" and insert -- "6." --, therefor.

In the Claims

In column 10, line 1, in Claim 6, delete "6"" and insert -- "5" --, therefor.

In column 10, line 8, delete "8."" and insert -- "7." --, therefor.

In column 10, line 8, in Claim 7, delete "6"" and insert -- "5" --, therefor.

In column 10, line 26, delete "9."" and insert -- "8." --, therefor.

Signed and Sealed this
Twenty-fourth Day of May, 2016

Michelle K. Lee
*Director of the United States Patent and Trademark Office*

CERTIFICATE OF CORRECTION (continued)
U.S. Pat. No. 8,200,679 B2

In the Claims

In column 10, line 29, delete "10."" and insert -- "9." --, therefor.

In column 10, line 32, delete "11."" and insert -- "10." --, therefor.

In column 10, line 42, in Claim 10, delete "on the path" and insert -- on said path --, therefor.

In column 10, line 44, in Claim 10, delete "of the path-based" and insert -- of said path-based --, therefor.

In column 10, line 48, in Claim 10, delete "to the path-based" and insert -- to said path-based --, therefor.

In column 10, line 52, delete "13."" and insert -- "11." --, therefor.

In column 10, line 53, in Claim 11, delete "11"" and insert -- "10" --, therefor.

In column 10, line 55, delete "14."" and insert -- "12." --, therefor.

In column 10, line 56, in Claim 12, delete "11"" and insert -- "10" --, therefor.

In column 10, line 59, delete "15."" and insert -- "13." --, therefor.

In column 10, line 60, in Claim 13, delete "11"" and insert -- "10" --, therefor.

In column 10, line 62, delete "16."" and insert -- "14." --, therefor.

In column 10, line 63, in Claim 14, delete "11"" and insert -- "10" --, therefor.

In column 11, line 4, delete "17."" and insert -- "15." --, therefor.

In column 11, line 5, in Claim 15, delete "16"" and insert -- "14" --, therefor.

In column 11, line 11, delete "18."" and insert -- "16." --, therefor.

In column 11, line 12, in Claim 16, delete "16"" and insert -- "14" --, therefor.

In column 12, line 10, delete "19."" and insert -- "17." --, therefor.

In column 12, line 11, in Claim 17, delete "11"" and insert -- "10" --, therefor.

In column 12, line 13, delete "20."" and insert -- "18." --, therefor.

In column 12, line 14, in Claim 18, delete "11"" and insert -- "10" --, therefor.

CERTIFICATE OF CORRECTION (continued)
U.S. Pat. No. 8,200,679 B2

In the Claims

In column 9, line 49-50, in Claim 2, delete "2. The method as recited in claim 1, wherein said path-based table construct comprises a set of rows.".

In column 10, line 49-51, in Claim 12, delete "12. The non-transitory machine-readable medium of claim 11, wherein said path-based table construct comprises a set of rows.".